(12) United States Patent
Bosch

(10) Patent No.: US 8,082,085 B2
(45) Date of Patent: Dec. 20, 2011

(54) METHOD FOR ENGAGING A GEAR IN A GEAR POSITION IN AN AUTOMATED SHIFT TRANSMISSION

(75) Inventor: Helmuth Bosch, Leverkusen (DE)

(73) Assignee: Getrag Ford Transmissions GmbH, Cologne (DE)

( * ) Notice: Subject to any disclaimer, the term of this patent is extended or adjusted under 35 U.S.C. 154(b) by 667 days.

(21) Appl. No.: 12/271,146

(22) Filed: Nov. 14, 2008

(65) Prior Publication Data

US 2009/0138163 A1    May 28, 2009

(30) Foreign Application Priority Data

Nov. 26, 2007   (DE) .......................... 10 2007 057 203

(51) Int. Cl.
    *G06F 7/00*   (2006.01)
(52) U.S. Cl. .......... 701/55; 477/158; 477/160; 477/163; 74/335; 74/329
(58) Field of Classification Search .................... 74/519, 74/329, 335; 477/158, 160, 163; 192/3.6, 192/331
    See application file for complete search history.

(56) References Cited

U.S. PATENT DOCUMENTS

| 6,619,152 B2 * | 9/2003 | Ochi et al. ...................... 74/335 |
| 7,494,442 B2 * | 2/2009 | Futamura et al. ............. 477/158 |

FOREIGN PATENT DOCUMENTS

| DE | 198 23 050 | 12/1998 |
| DE | 199 14 394 | 6/2000 |
| DE | 100 27 332 | 12/2000 |

* cited by examiner

*Primary Examiner* — Behrang Badii
(74) *Attorney, Agent, or Firm* — Schlee IP International, P.C.; Alexander R. Schlee

(57) ABSTRACT

A method for shifting a gear into a gear position in an automated shift transmission with several gears and an automated shift transmission adapted to perform said method are suggested. Via a shifting fork, a shifting sleeve can be shifted from a neutral position into respective gear positions and reaches on its way a pull-in position where the shifting sleeve is automatically forced in direction of the gear position. It is achieved that the pull-in position is safely reached by checking whether the shifting fork has reached a first threshold value, a second threshold value, and whether it has come to a standstill therebetween. Accordingly, an increased shifting force can be applied. Albeit allowing production tolerances in the transmission, the respective gear position is safely reached.

20 Claims, 2 Drawing Sheets

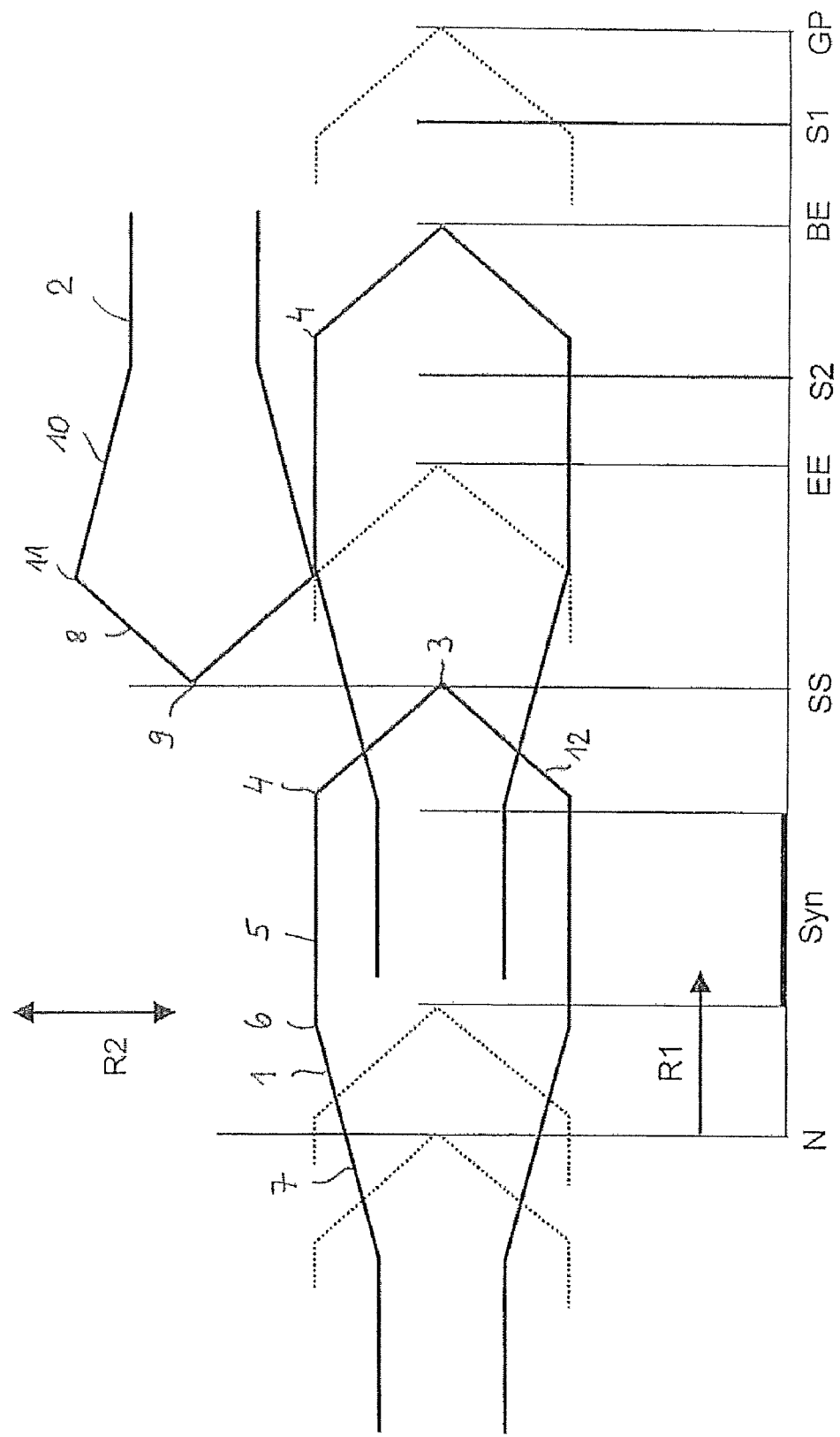
Figur 1

Figur 2
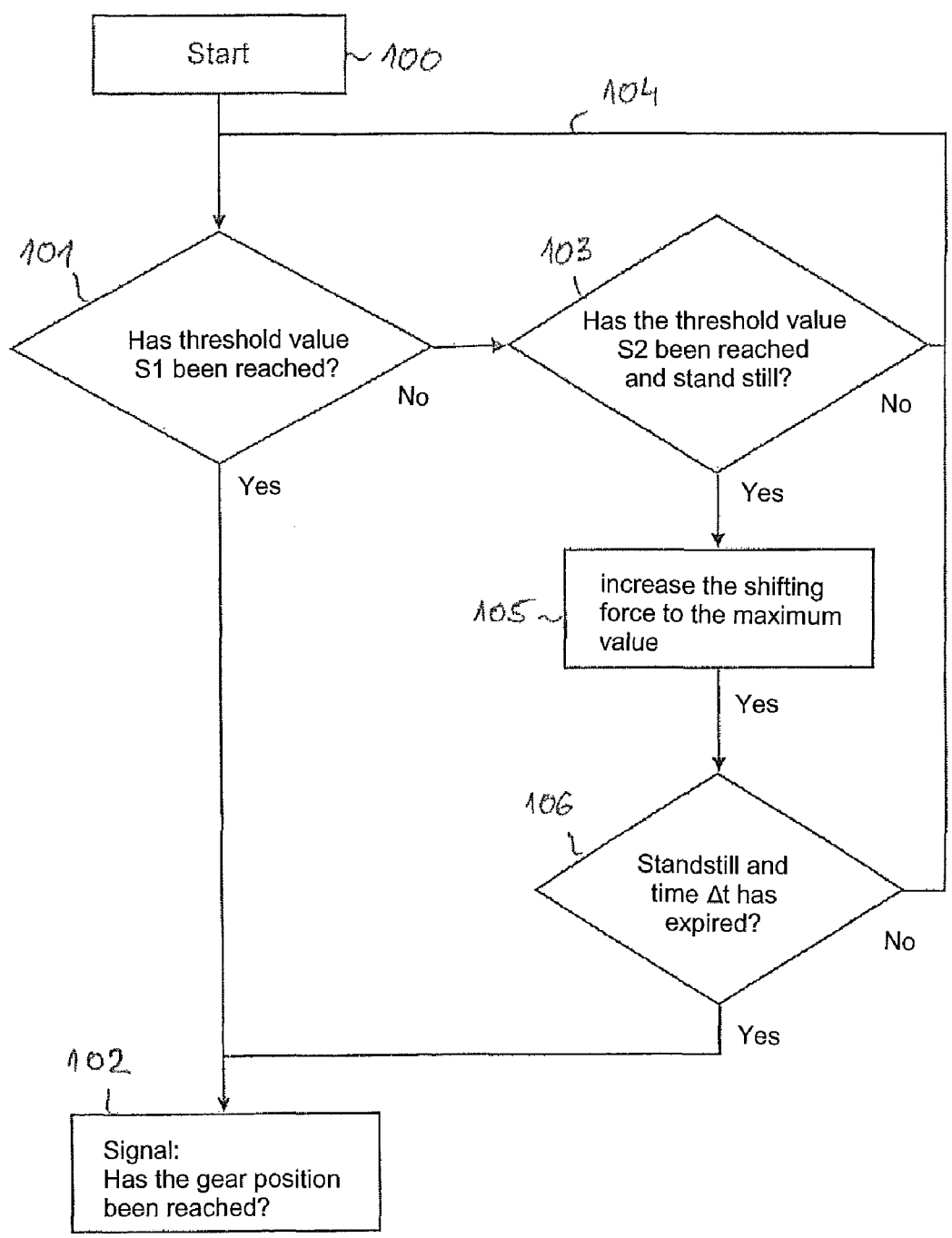

METHOD FOR ENGAGING A GEAR IN A GEAR POSITION IN AN AUTOMATED SHIFT TRANSMISSION

CROSS REFERENCE TO RELATED APPLICATION

This application claims the priority right from the German patent application DE 102007057203.6 that was filed on Nov. 26, 2007, the content of which is herewith incorporated in its entirety by reference.

BACKGROUND OF THE INVENTION

The invention relates to a method for engaging a gear in a gear position in an automated shift transmission comprising several gears.

Recently, automated shift transmissions have been used in motor vehicles in series. In such automated shift transmissions, the individual gears can be engaged by hydraulic or electric actuators. A gear is typically engaged by having at least one of the actuators move a shifting fork that is mechanically coupled to a shifting sleeve. When engaging a gear, starting from a neutral position N by shifting a shifting fork and therefore the shifting sleeve, a positive interlocking between the shifting sleeve and a shaft to which is it fixed in a relatively non-rotatable manner and a loose wheel of a gear is accomplished. In this positive interlocking state, an internal toothing of the shifting sleeve is engaged by the toothing of a coupling wheel that relates to the gear loose wheel. When this positive interlocking is established and the shifting sleeve has reached its end stop, the shifting fork and the shifting sleeve are in a gear position that is in the following denoted GP.

When passing from the neutral position N into the gear position GP, the shifting fork passes a position that characterizes the start of the so-called pull-in effect (position BE). This pull-in effect is accomplished by a particular shape of the teeth of the internal toothing of the shifting sleeve and/or the teeth of the coupling wheel of the gear's loose wheel. If a torque acts between the shaft and the gear's loose wheel, the shifting sleeve is forced by the shape of the teeth in direction of the gear position GP, or if a gear is engaged already, is held in that gear position GP (pull-in effect). This avoids that the gear might be disengaged in an undesired manner.

For controlling the actuator that can shift the shifting fork typically a sensor for determining the position of the shifting fork is required. For determining the gear position GP of the gears of an individual shift transmission apart from tolerances in the sensor also mechanical tolerances, deviations and play apply, such as for instance axial bearing play as well as shaft and shifting fork deformations. In addition, in the large series production, also variations between the various transmissions in the end stop position occur due to tolerances in the component parts.

Prior art methods for controlling an actuator control the position of a shifting fork to a defined gear position. Due to the existing variances this might result in problems. If for instance during gear shifting action the actual gear position is reached before the apparent gear position on which the control is based is reached, the desired end position appears not to have been reached. This might cause an incorrect error signal. In contrast, the apparent gear position that the control tries to establish might be reached prior to reaching the actually desired gear position. In this case, the danger is that the control turns off too soon while the shifting sleeve has not yet reached the position where the pull-in effect starts, so that the gear can be disengaged in a undesired manner.

SUMMARY OF THE INVENTION

It is an object of the invention to create a method for shifting into a gear resulting in establishing reliably a gear position in an automated shift transmission albeit non-avoidable variances and tolerances exist.

The method according to the invention comprises a step A wherein it is checked whether the shifting fork has reached a first threshold value S1 starting from the neutral position N. This first threshold value S1 has been set to be between the position BE, i.e. before the start of the pull-in position, and the gear position GP.

In a step B that preferably follows step A, it is checked whether the shifting fork has reached a second threshold value S2 that is reached, viewed from the neutral position N, before reaching the position BE. Step B further comprises checking whether the shifting fork has come to a standstill between the second threshold value S2 and the first threshold value S1. Despite an applied shifting force a standstill may happen due to blockages, frictional resistance etc. The threshold value S2 is preferably set to be close to but before the position BE.

During a gear shifting action, i.e. during shifting of the shifting fork from the neutral position in direction of the gear position GP, the above described steps can be repeated continuously in a loop until the termination criterion for this loop is fulfilled and the loop is terminated. Method steps according to the invention are further described in the following steps C and D.

If checking according to step B has provided the result that the shifting fork has passed the second threshold value S2 but has not yet reached the first threshold value, and simultaneously a standstill is determined, according to step C an increased force in direction of the gear position GP is applied onto the shifting fork. This maximum shifting force is applied for overcoming resistance that has resulted in a sticking or blocking of the shifting fork between the threshold values S2 and S1. Such sticking condition or blockage should be limited between an area between the second threshold value S1 and the position BE since during the shifting action the pull-in effect accomplishes from the position BE that the gear position is securely reached.

In step D, the method according to the invention is finalized by generating a signal indicating that the gear position GP has been reached. Generating of this signal can be viewed as the end of the process of engaging the gear or can initiate the termination of the engaging process. Further, the signal can be used as a starting signal for further control processes in the shift transmission or in a clutch system interacting with the shift transmission.

The signal indicating that the gear position has been reached is generated when the shifting fork has reached the first threshold value S1. In this case, the shifting fork has passed the position BE and has reached the gear position GP, eliminating the risk of being disengaged from the gear. Therefore, step B can follow immediately step A when the threshold value S1 has been reached.

The signal indicating that the gear position has been reached is also generated in the step D when the increased shifting force has at least been applied over a time Δt and after expiration of the time Δt a further standstill of the shifting fork has been determined. In this connection, it is assumed that increasing the shifting force results in that the shifting fork starts moving again and that said movement does not end prior to the shifting fork reaching the gear position GP (end stop). The time Δt has been chosen such that the increased or maximum shifting force is not only applied over too short a time period. Otherwise, the re-established movement of the shifting fork might stop again prior to reaching the position BE. Step D might therefore also follow immediately step C (increased shifting force).

Checking the reaching the first threshold value S1 and/or second threshold value S2 can be conducted by at least two sensor readings that are taken at two different points in time, respectively. Likewise, determination of the standstill condition can be made by at least two sensor readings that are taken at two different points in time. A standstill condition is detected if the difference between the two sensor readings taken at points spaced apart in time is zero or is below a negligible limit. When checking the reaching of the first threshold value S1 it might be sufficient that at least two sensor readings each indicate positions of the shifting fork that starting from the neutral position N are behind the first threshold value S1, but can differ from each other. The time between the two sensor readings can be in a range between 5 and 20 ms. The value of 10 ms has been proven successful in practical application.

Preferably, for all gears a same first threshold value S1 is set. In the alternative or in addition this may also apply for the second threshold value S2. The threshold values S1 and S2 are preferably determined such that regardless of the variances and tolerances of the method according to the invention it works reliably and securely for all gears even though the individual gear positions of the particular gears might differ from each other in the shift transmission. For example, a shifting sleeve assigned to a first gear might have to move starting from the neutral position N into the gear position GP by a distance of 8.5 mm, while for example a shifting sleeve that is assigned to the second gear has to move starting from the neutral position N into the gear position GP by 9 mm.

Preferably, it can be provided that in a training phase for the shift transmission the respective gear position GP is measured for each gear and a respective sensor signal relating to these respective gear positions GP is scaled to a nominal gear position $GP_n$. This measure accomplishes that the length of the shifting path or the position of the individual gears are standardized to a value for the respective gear position GP that corresponds to the set threshold values S1 and S2. By scaling to standard values it is prevented that in case of unified threshold values S1, S2 for all gears a problem arises when for example the threshold value S1 for a gear with a very short shifting path is too high and for a gear with a very long shifting path too low.

According to a preferred embodiment, upon receiving a signal that a particular gear position GP has been reached during ordinary operation of the shift transmission, the position of the shifting fork is determined and a sensor signal correlating to this position is re-scaled to a new, nominal gear position $GP_{n,neu}$. This can compensate for influences such as the transmission temperature or wear and aging processes.

The sensor for determining the position of the shifting fork or the shifting sleeve can be designed in various manners. Preferred is an embodiment as a magnetic field sensor that allows a contactless detection of the position of the shifting fork. The magnetic field sensor interacts in this case with a magnet wherein preferably the magnetic field sensor is located in a fixed manner in the shift transmission and the magnet is provided at the movable shifting fork.

When the magnet is provided at the shifting fork, due to a deformation of the shifting fork, the position of the magnet and therefore the position determined by the sensor of the shifting fork might deviate from the position of the shifting sleeve. A deformation of the shifting fork may in particular occur when the shifting fork is subjected to a shifting force and is stopped due to undesired resistance prior to reaching the position BE. The possible deformation of the shifting fork and the differences in the positions as determined by the sensor from the actual position of the shifting sleeve can be taken into consideration when selecting the threshold values S1 and S2. If, for instance, the position BE of a gear is 7.5 mm, the threshold value S2 taking the deformation of the shifting fork into consideration can be set to 8 mm. If the difference due to a deformation of the shifting fork is for example 0.7 mm, the threshold value S2 relating to the shifting sleeve would still be before the shifting sleeve reaches the position BE.

BRIEF DESCRIPTION OF THE DRAWINGS

In the following, the invention is explained in more detail by referring to the drawings. In the drawings show:

FIG. 1 schematically the engagement between teeth of a shifting sleeve with the teeth of a clutch wheel when shifting into a gear; and FIG. 2 a flow diagram of a preferred embodiment of the invention.

DETAILED DESCRIPTION OF THE DRAWINGS

FIG. 1 shows schematically the interaction between a tooth 1 of an internal toothing of a shifting sleeve that has not been shown in more detail, and a tooth 2 of a loose wheel in the shift transmission that has likewise not been shown in further detail. When shifting into a gear that is assigned to the non-shown loose wheel, the tooth 1 is shifted from its neutral position N into a gear position GP in the direction R1. The shifting into direction R1 extends in parallel to an axis of a shaft (not shown) supporting the non-shown loose wheel.

The tooth 1 is shown in FIG. 1 in different positions, wherein some of the positions are only depicted by dotted lines. The tooth 1 comprises a pointed section 12 comprising a tip 3. At a front corner 4 of the tooth 1 a parallel transition section 5 is connected and extends in parallel to the direction R1, followed by a recessed section 7 at the rear corner of the parallel transition section.

The tooth 2 that is fixed in axial direction or direction R1 comprises a similar design. Also this tooth comprises a pointed section 8 with a tip 9 and a recessed section 10. However, between the pointed section 8 and the recessed section 10 there is no transition section so that at a corner 11 the pointed section 8 and the recessed section 10 are connected to each other.

In the following it is assumed that the position of a shifting fork that is in a fixed connection in the direction R1 with the (non-shown) shifting sleeve and therefore with the tooth 1 is at the same position as the position of tooth 1. Possible deformations of the shifting fork during the shifting action due to shifting forces applied to the shifting fork during the shifting action are not considered in this embodiment.

When engaging a gear, the shifting fork and therefore also the tooth 1 is moved from the neutral position N in direction of the gear position GP. The required thrust forces are provided in an automated shift transmission by hydraulic or electric actuators. After having passed through an area Syn where a synchronization of rotational speed of the loose wheel and therefore of the tooth 2 with the rotational speed of the shifting sleeve and therefore tooth 1 takes place, tooth 1 reaches a position SS. In this position, the tips 3, 9 of the teeth 1, 2 are in the same plane. Depending on the position of the tips 3, 9 in a circumferential direction R2 the teeth 1, 2 have to align with respect to each other, so that the tooth 1 can move further in the direction of the gear position GP. In the schematic FIG. 1, such an alignment in the direction R2 is not necessary.

After having reached the position SS, the tooth 1 reaches a position EE where the front corner 4 of the tooth 1 and the corner 11 of the tooth 2 are in a directly opposed position with respect to each other. A further movement of the tooth 1 reaches the transition section 5 that slides along the corner 11 until the rear corner 6 reaches the corner 11 of the tooth 2. At this point, the tooth 1 has reached the position BE. In this position BE the so-called pull-in effect starts. Due to the recessed sections 7, 10 of the teeth 1, 2 the tooth 1 is pulled into the direction of the gear position GP due to a torque that is transmitted between the teeth 1, 2 in a circumferential direction R2. Due to the incline of the recessed sections 7, 10 the applied torque generates a force acting into direction R1. Due to this force, the tooth 1 is pulled without any external forces starting from the position BE into the gear position GP. If the tooth 1 is already in its gear position GP, the pull-in effect secures that tooth 1 cannot jump out of its gear position GP when not desired.

Between the position BE and the gear position GP a first threshold value S1 is provided. A second threshold value S2 is provided between the position EE and the position BE. In the following, it is referred to these threshold values S1, S2 in the description describing FIG. 2.

FIG. 2 shows a flow diagram of a preferred embodiment of the invention. After the method has been started (see block 100) it is checked in a determination 101 whether the tooth 1 has reached the first threshold value S1. If this is the case, the determination 101 is followed by a block 102 where a signal is generated, indicating that the gear position GP has been reached.

As can be gathered from FIG. 1, reaching of the first threshold value S1 does not necessarily mean that the tooth 1 is already in its gear position GP. Since the first threshold value S1 as viewed from the neutral position N is behind the position BE, it can be assumed based on the pull-in effect that the tooth 1 is moved further into direction of the gear position GP or is at least held in an area close to it. The signal that is generated in block 102 can be used for turning the actuators off that were forcing the tooth 1 from its neutral position N into the present position.

If the first threshold value S1 has not yet been reached, determination 101 is followed by another determination 103. In this determination 103 it is checked whether the tooth 1 has reached the second threshold value or whether it has come to a standstill. If the second threshold value S2 has already been exceeded, however, no standstill is established if the tooth 1 is still moving. In this case, the determination result from the determination 103 is "no" so that in a loop 104 the position of the tooth 1 is continuously checked.

If, however, the tooth 1 stands still between the second threshold value S2 and the first threshold value S1, the shifting force is increased in block 105 until it reaches its maximum value. Increasing to a maximum value is intended to secure that resistance is overcome that has resulted in a standstill condition of the tooth 1. If in a determination 106 after a certain time Δt has passed again a standstill of the tooth 1 is determined, it is assumed that the applied maximum shifting force has overcome the resistance and that the tooth 1 is now in its gear position GP. Accordingly, the block 102 follows the determination 106 if the time Δt has expired and a standstill has been determined.

The advantage of the method according to the invention is that the exact position of the tooth 1 does not matter. In contrast, the threshold values S1, S2 define windows or ranges in which the tooth 1 has to be for a starting of various method steps. The method according to the invention applies in an advantageous manner the pull-in effect. Setting the threshold values S1, S2 can be chosen such that these threshold values apply for all gears in the shift transmission.

LIST OF REFERENCE NUMERALS 1 tooth
2 tooth
3 tip
4 front corner
5 transition section
6 rear corner
7 recessed section
8 pointed section
9 tip
10 recessed section
11 corner
12 pointed section
100 block
101 determination
102 block
103 determination
104 loop
105 block
106 determination
N neutral position
SS tip-to-tip position
EE corner-to-corner position
S2 second threshold value
BE starting position of pull-in effect
S1 first threshold value
GP gear position
R1 direction
R2 direction

The invention claimed is:

1. A Method for shifting a gear into a gear position in an automated shift transmission with several gears, comprising at least one movable shifting fork guiding a shifting sleeve and having at least one sensor for determining the position of the shifting fork or the shifting sleeve, wherein the shifting fork is movable starting from a neutral position into the direction of the gear position, and wherein at a pull-in position of the shifting fork between the neutral position and the gear position a pull-in effect starts, forcing the shifting sleeve by a force in direction of the gear position, said method comprising the following method steps:

A: checking whether the shifting fork has reached a first threshold value that is between the position and the gear position;

B: checking whether the shifting fork has reached a second threshold value that is as viewed from the neutral position reached before reaching the position, and checking whether the shifting fork has come to a standstill between the second threshold value and the first threshold value, C: applying an increased force in the direction of the gear position onto the shifting fork if the shifting fork has come to a standstill between the second threshold value and the first threshold value; and D: generating a signal indicating that the gear position has been reached when the shifting fork has reached the first threshold value or when the increased shifting force has at least been applied over a time and after expiration of the time a further standstill of the shifting fork has been determined.

2. Method according to claim 1, further comprising the method step of taking at least two sensor readings at two different points in time, respectively, and checking reaching at least one of the first threshold value and second threshold value and of a standstill condition by said two readings.

3. Method according to claim 1, further comprising the method step of setting for all gears the same first threshold value.

4. Method according to claim 1, further comprising the method step of setting for all gears the same second threshold value.

5. Method according to claim 1, further comprising the method step of measuring in a training phase for the shift transmission the respective gear position for each gear and scaling a respective sensor signal relating to these respective gear positions to a nominal gear position.

6. Method according to claim 1, further comprising the method step of receiving a sensor signal that a particular gear position has been reached during ordinary operation of the shift transmission, determining the actual position of the shifting fork, and re-scaling the received sensor signal correlating to said actual position to a new, nominal gear position.

7. Method according to claim 1, further comprising the method step of providing a magnetic field sensor as said sensor.

8. Method according to claim 1, further comprising the method step of setting the first threshold value and/or second threshold value by taking a deformation of the shifting fork into consideration.

9. Method according to claim 1, further comprising the method step of setting the distance between the first threshold value and the second threshold value to less than 1 mm.

10. Method according to claim 1, further comprising the method step of setting the distance between the first threshold value and the second threshold value to less than 0.5 mm.

11. An automated shift transmission with several gears, comprising at least one movable shifting fork guiding a shifting sleeve and having at least one sensor for determining the position of the shifting fork or the shifting sleeve, wherein the shifting fork is movable starting from a neutral position into the direction of the gear position, and wherein at a pull-in position of the shifting fork between the neutral position and the gear position a pull-in effect starts, forcing the shifting sleeve by a force in direction of the gear position, said transmission comprising means for:

A: checking whether the shifting fork has reached a first threshold value that is between the pull-in position and the gear position;

B: checking whether the shifting fork has reached a second threshold value that is as viewed from the neutral position reached before reaching the pull-in position, and checking whether the shifting fork has come to a standstill between the second threshold value and the first threshold value;

C: applying an increased force in the direction of the gear position onto the shifting fork if the shifting fork has come to a standstill between the second threshold value and the first threshold value; and D: generating a signal indicating that the gear position has been reached when the shifting fork has reached the first threshold value or when the increased shifting force has at least been applied over a time and after expiration of the time a further standstill of the shifting fork has been determined.

12. Automated shift transmission according to claim 11, wherein checking of reaching at least one of the first threshold value and second threshold value and the standstill condition is conducted by at least two sensor readings that are taken at two different points in time, respectively.

13. Automated shift transmission according to claim 11, wherein for all gears the same first threshold value is set.

14. Automated shift transmission according to claim 11, wherein for all gears the same second threshold value is set.

15. Automated shift transmission according to claim 11, wherein in a training phase for the shift transmission the respective gear position is measured for each gear and a respective sensor signal relating to these respective gear positions is scaled to a nominal gear position.

16. Automated shift transmission according to claim 11, wherein upon receiving a signal that a particular gear position has been reached during ordinary operation of the shift transmission the position of the shifting fork is determined and a sensor signal correlating to this position is re-scaled to a new, nominal gear position.

17. Automated shift transmission according to claim 11, wherein the sensor is a magnetic field sensor.

18. Automated shift transmission according to claim 11, wherein for setting at least one of the first threshold value and the second threshold value a deformation of the shifting fork is taken into consideration.

19. Automated shift transmission according to claim 11, wherein the distance between the first threshold value and the second threshold value is shorter than 1 mm.

20. Automated shift transmission according to claim 11, wherein the distance between the first threshold value and the second threshold value is shorter than 0.5 mm.

* * * * *